United States Patent [19]

Wakamatsu et al.

[11] Patent Number: 5,047,297
[45] Date of Patent: Sep. 10, 1991

[54] MAGNETIC RECORDING MEDIUM AND MANUFACTURING METHOD THEREOF

[75] Inventors: Hiroaki Wakamatsu, Yokohama; Yoshihiro Mitobe, Nagano; Katsumi Kiuchi, Ebina, all of Japan

[73] Assignee: Fujitsu Limited, Kawasaki, Japan

[21] Appl. No.: 219,696

[22] Filed: Jul. 7, 1988

[30] Foreign Application Priority Data

Jul. 9, 1987 [JP] Japan .............................. 62-172219

[51] Int. Cl.$^5$ .............................................. G11B 23/00
[52] U.S. Cl. .............................. 428/694; 204/192.2; 428/611; 428/667; 428/900
[58] Field of Search ............... 428/611, 660, 694, 667, 428/900; 204/192.2; 427/131

[56] References Cited

U.S. PATENT DOCUMENTS

| | | | |
|---|---|---|---|
| 4,231,816 | 11/1980 | Cuomo et al. | 204/192.2 |
| 4,675,240 | 6/1987 | Weiss | 428/611 |
| 4,696,862 | 9/1987 | Kawana et al. | 428/694 |
| 4,745,031 | 5/1988 | Nakayama et al. | 428/611 |
| 4,749,459 | 6/1988 | Yamashita et al. | 204/192.2 |
| 4,880,514 | 11/1989 | Scott et al. | 204/192.2 |

FOREIGN PATENT DOCUMENTS

A0216610 4/1987 European Pat. Off. .
WO86/05214 9/1986 PCT Int'l Appl. .

OTHER PUBLICATIONS

Patent Abstracts of Japan, vol. 11, No. 72.
Patent Abstracts of Japan, vol. 9, No. 236.

*Primary Examiner*—Paul J. Thibodeau
*Attorney, Agent, or Firm*—Armstrong, Nikaido, Marmelstein, Kubovcik & Murray

[57] ABSTRACT

A magnetic recording medium, comprising Cr base layer containing up to about 25 atom % of nitrogen, preferably 5 to 15 atom %, and a magnetic film of Co alloy such as Co-Ni or Co-Ni-Cr alloy material deposited thereon, shows a clear improvement over that using a pure Cr base layer without nitrogen content in medium noise level and S/N ratio. In case of about 10 atom % nitrogen content in the base layer, the medium noise level is reduced by half and the S/N ratio is improved by 6 to 9 dB, while the other magnetic characteristics such as coercivity Hc, residual magnetization Br, and squareness ratio Sq are remaining the same.

17 Claims, 5 Drawing Sheets

NITROGEN CONTENT (atm%)
IN Cr BASE LAYER

NITROGEN CONTENT (atm%)
IN Cr BASE LAYER

MAGNETIC RECORDING MEDIUM AND MANUFACTURING METHOD THEREOF

BACKGROUND OF THE INVENTION

1. Field of the Invention

The present invention relates to a magnetic recording medium used in a magnetic disk drive and a manufacturing method thereof. More particularly, the present invention relates to a magnetic recording medium which has a large residual magnetization and high coercive force such that a high signal to noise ratio is realized when the disk is used in the magnetic disk drive.

2. Description of the Prior Art

In the prior art, it is known that a structure of a magnetic film cobalt alloy such as a cobalt-nickel (Co-Ni) alloy or cobalt-nickel-chromium (Co-Ni-Cr) alloy, deposited on a chromium base layer formed on a substrate is a suitable magnetic recording medium having high residual magnetization and high coercivity for use in a magnetic disk drive. A cross section thereof is shown in FIG. 1, wherein a substrate 11 of an aluminum alloy or a hard glass is used. A Cr base layer 12, magnetic film 13 of Co-Ni or Co-Ni-Cr alloy, and a cover layer 14 are laminated one by one on the substrate. Cover layer 14 is of carbon (C), silicon oxide or the like, and serves both as a lubricating and a protective layer. Sputtering technology using an argon gas is generally used in forming the above multilayer structure.

Representative values for the above magnetic recording medium using Co-Ni alloy as the magnetic film are shown in Table 1.

TABLE 1

| | |
|---|---|
| Coercivity Hc; | 600 Oe |
| Residual Magnetization Br; | 13000 Gauss |
| Squareness Ratio Sq (Bs/Br); | 0.9 |
| Signal to Noise Ratio S/N; | 35–38 dB |

In Table 1, Bs denotes saturation magnetization, signal level S is measured as a reproduced peak to peak signal voltage for a record of isolated magnetic transitions, and noise N is measured as an rms (root mean square) noise voltage for a recording density of $D_{50}$, wherein $D_{50}$ is defined as a recording density at which the signal output is reduced to 50% from the level for isolated magnetic transitions.

When the above values are compared with those for a sputtered $\gamma$-$Fe_2O_3$ magnetic thin film, coercivity Hc is almost the same, but residual magnetization Br values for the former are greatly increased. In the case of $\gamma$-$Fe_2O_3$, Br values of about 2500 Gauss can be obtained. Therefore, the magnetic recording medium comprising a chromium base layer and a magnetic film of a Co alloy is superior in performance in obtaining a higher output and easy application even for a magnetic disk drive of low speed. On the other hand, S/N ratio values such as 35–38 dB for the Cr base layer and Co-Ni alloy magnetic film are lower than the values obtained for an $\gamma$-$Fe_2O_3$ magnetic film, which shows a higher S/N ratio such as 46–48 dB.

SUMMARY OF THE INVENTION

It is a general object of the invention, therefore, to provide a magnetic recording medium and a manufacturing method thereof, the magnetic recording medium being characterized by high recording density, high output and low noise.

It is a more specific object of the invention to provide a magnetic recording medium having an improved S/N ratio characteristic, without adversely affecting Hc, Br and Sq values, obtained for the structure comprising a Cr base layer and a Co-Ni alloy magnetic film such as shown in Table 1.

It is another object of the invention to provide a convenient method of manufacturing the magnetic recording medium with only a small change in the manufacturing process conventionally used.

These and other objects are achieved by the structure of the magnetic recording medium of the present invention, comprising a non-magnetic substrate, a Cr base layer thereon and a magnetic film of a Co alloy such as a Co-Ni alloy or a Co-Ni-Cr alloy, wherein the Cr base layer contains a noise-reducing amount of nitrogen atoms.

Other objects and advantages of the present invention will become apparent from the following detailed description when read in conjunction with the appended claims.

BRIEF DESCRIPTION OF THE DRAWINGS

FIG. 9 and 10 show a cross section at two stages in fabrication of the magnetic recording medium in order to explain the manufacturing method of the present invention, wherein FIG. 9 shows a cross section after formation of the base layer and FIG. 10, after formation of the magnetic film.

DETAILED DESCRIPTION OF THE PREFERRED EMBODIMENTS

Figure 1:
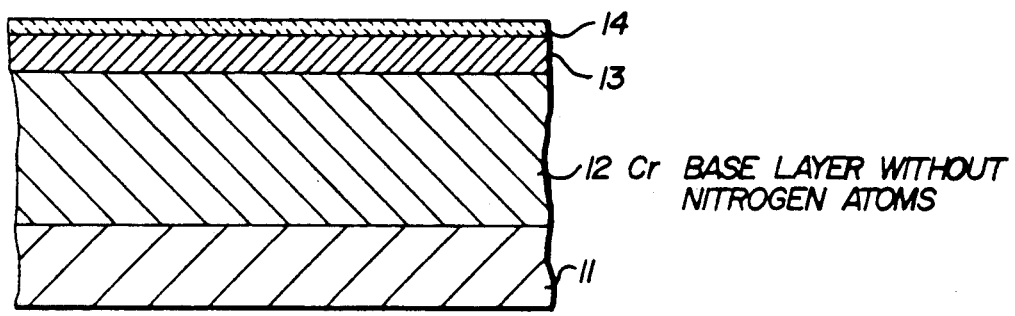
FIG. 1 shows a cross section of a magnetic recording medium of the prior art.
Figure 2:
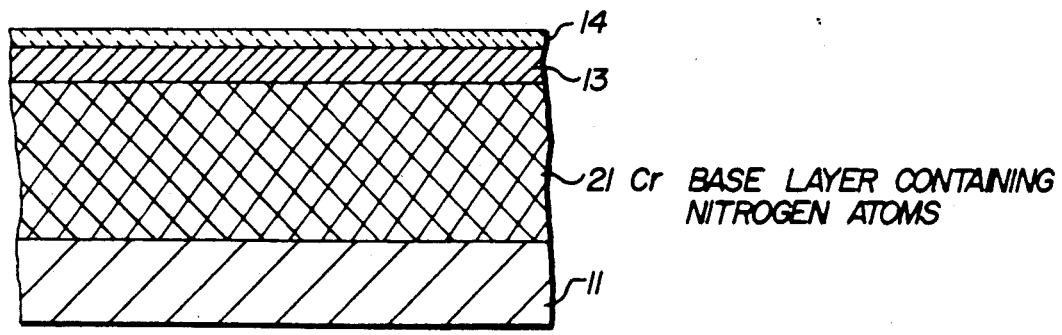
FIG. 2 shows a cross section of a magnetic recording medium of the present invention, which is similar in cross section to the medium shown in FIG. 1, but in which base layer 21 is different in composition.

FIG. 2 is a cross section, partly shown, of the magnetic recording medium according to the present invention. A substrate 11 of a material such as aluminum alloy, or hard glass, having a thickness of about 1–3 mm is used. On the substrate 11, according to the invention, a Cr base layer 21 containing a noise-reducing amount of nitrogen atoms in an amount up to 25 atom % is deposited to a thickness of about 3000 Å. Then, a magnetic film 13 of a Co alloy such as Co-Ni, Co-Ni-Cr, etc. is deposited in a thickness of about 500 Å. Other alloys such as Co-Ni-Mo, Co-Ni-Pt, and Co-Ni-W can also be used. A cover layer 14 of, for example, carbon having a thickness of 300 Å is finally deposited thereon. This cover layer 14 serves as a protecting and as a lubricating medium. Other materials such as silicon dioxide ($SiO_2$) and zirconium dioxide ($ZrO_2$) may be used for the cover layer 14. The detailed of the method of forming the above laminated structure is explained later.

Figure 3:
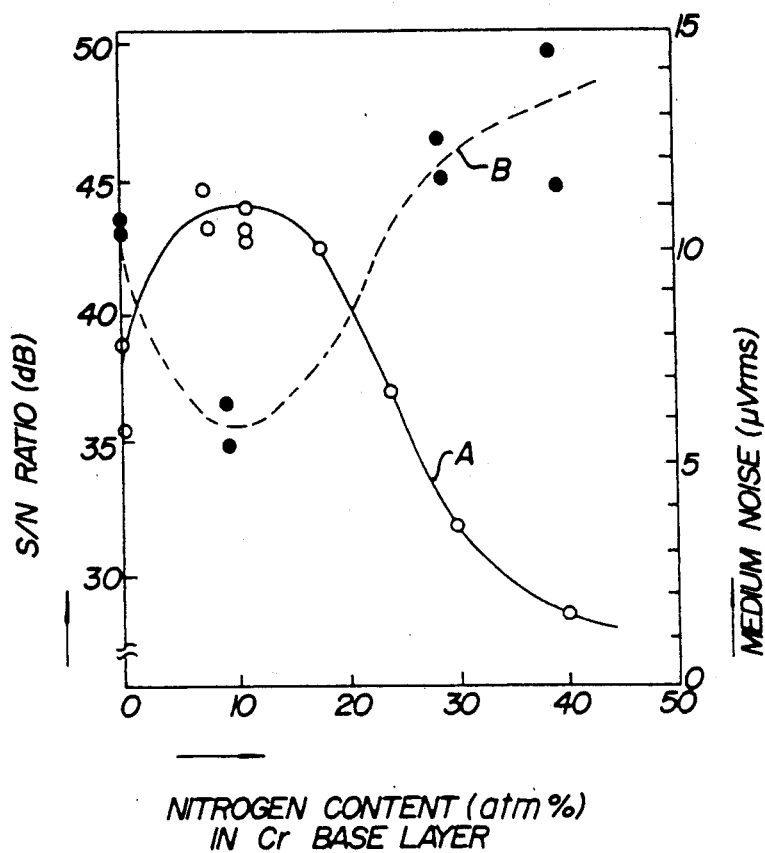
FIG. 3 shows S/N ratio data and medium noise level values versus nitrogen content in the Cr base layer, wherein a range of nitrogen content of up to 25 atom %, according to the present invention, shows an improvement in noise characteristics.

Varying the content of nitrogen atoms in the Cr base layer 21, a plurality of test disks were made and their noise characteristics were measured. The magnetic film of Co-Ni alloy was used for the test disks. The data are illustrated in FIG. 3, wherein the abscissa shows nitrogen atom percentage in the Cr base layer, and the left ordinate shows S/N ratio data for the solid curve A and the right ordinate shows a medium noise level for the dashed curve B. Here, medium noise is defined as the total of modulation noise and DC erase noise, excluding the noise originating from a measuring circuit, a magnetic head, etc.

The S/N ratio (curve A) shows a remarkable increase and decrease characteristic in a range of nitrogen atom content between 0 and 25 atom %, having a peak value of about 44 dB at 10-11 atom %, which is an improvement of 6 to 9 dB. The peak also corresponds to a minimum noise level (curve B), wherein the medium noise level is reduced to 6 micro Vrms from a value of 11 micro Vrms for a Cr base without nitrogen atoms. The two curves of FIG. 3 also show that S/N ratio and noise data deteriorate rapidly in a range of nitrogen over 25 atom %. Above this nitrogen content, values are worse than those for the structure where nitrogen atoms have not been introduced. In an actual application, an S/N ratio higher than about 42 dB is preferred. A nitrogen content of 1 atom % or higher and in a range of from 5 to 15 atom % is preferred for noise reduction. For other magnetic characteristics such as residual magnetization Br, coercivity Hc and squareness ratio Sq, similar value are obtained over a wide range of nitrogen atom content.

Some reasons are suggested for the noise reduction obtained by introducing nitrogen atoms in the Cr base layer. First, the grain size of the Cr crystal as measured by X-ray diffraction, is changed by changing the mixing ratio of nitrogen gas in the argon gas during the sputtering process for applying the Cr base layer. The mixing ratio of the nitrogen gas is varied between 0 and 10%, which corresponds to a nitrogen atom content ranging between 0 and 40 atom % in the Cr base layer. The grain size values are shown in FIG. 4, wherein the grain size t is obtained from the following relation:

$$t = 0.9\lambda / B \cos \theta,$$

where $\lambda$ denotes wavelength of X-ray; B, half value breadth of diffracted X-ray in radians; and $\theta$, Bragg angle in radians.

Figure 4:
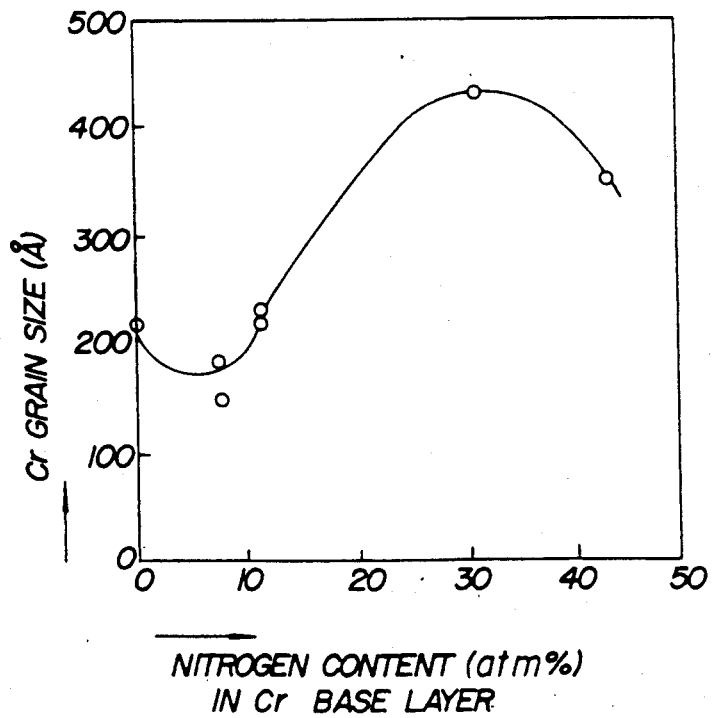
FIG. 4 illustrates a curve showing the change of grain size of Cr crystal due to the introduction of nitrogen atoms in the base layer.

As seen from the curve in FIG. 4, the grain size of the Cr base layer decreased gradually in the range less than 10 atom % of nitrogen content (10 atom % nitrogen content was formed using a mixing ratio of 0.5 to 1.0% of nitrogen gas in the argon gas) and then increased gradually in a range over 10 atom %, having a minimum around 10 atom % content. This curve shows the phenomena that, when nitrogen atoms are added to the Cr base layer, the grain size of base layer decreased gradually, reached a minimum and thereafter gradually increased as the atom % of nitrogen increased. Noise data for the smaller grain size showed the lower noise level.

However, the noise reduction obtained cannot be explained only by the grain size theory. Noise tests were conducted for several kinds of disks having a different grain size in the Cr base layer using a pure argon gas. The noise level did not show a clear dependency on the grain size such as observed in FIGS. 3 and 4. However, for the pure Cr base layer without nitrogen atoms, the absolute noise level was about twice as high as the level which can be obtained sputtering the Cr in a mixed gas of 99.5% argon and 0.5% nitrogen.

Another reason for noise reduction was sought and further analysis of the laminar composition along a vertical depth from the medium surface was conducted using Auger Electron Spectroscopy (AES) method. Ion etching on the surface of test disk and AES measurement were alternately conducted for several kinds of disks having a different nitrogen atom content in the base layer.

Representative test results are shown in FIGS. 5 through 8. The abscissa shows total etching time from the start, which is almost proportional to the depth from the initial medium surface, and the ordinate shows the content of each element in atom %. These figures show that the three layers, i.e., carbon cover layer, magnetic film of Co-Ni, and the Cr base layer containing nitrogen atoms, have two interface zones between two adjacent laminated layers. In the interface zones, each atom % of component elements gradually increases or decreases, attributed to the fact that mutual diffusion is taking place during the sputtering processes.

Figure 5:
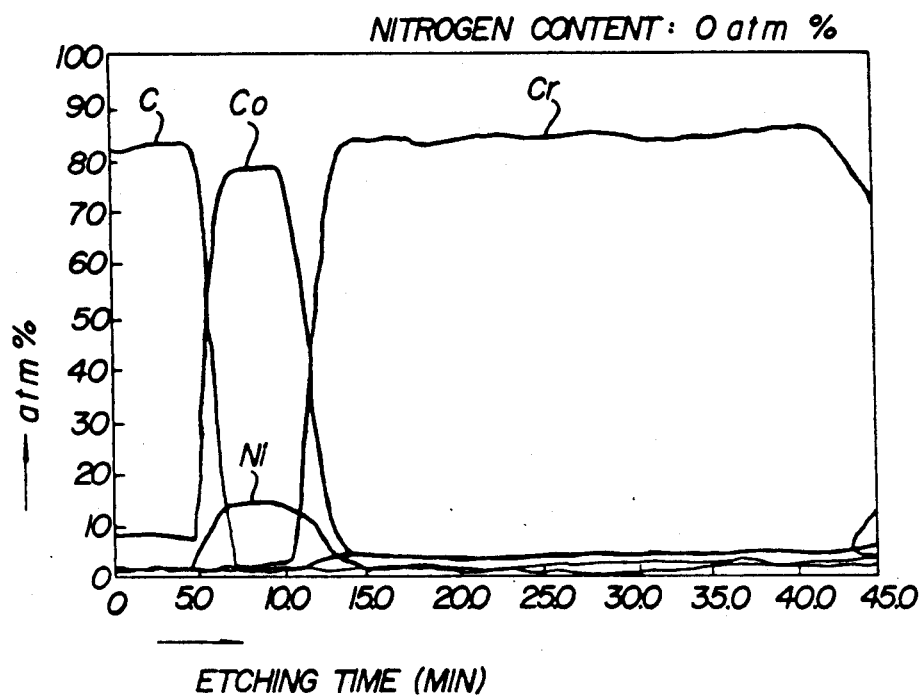
FIGS. 5 through 8 illustrate the results of an AES analysis for the composition of magnetic recording media, containing nitrogen in the Cr base layer in an amount of 0, 10, 30, and 40 atom % respectively.
Figure 6:
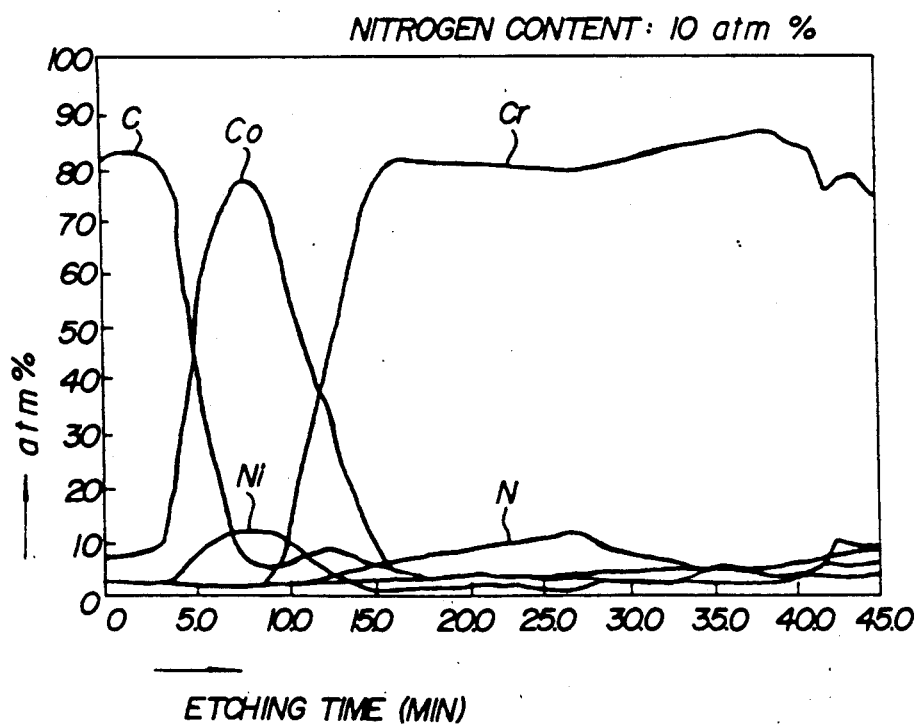
Figure 7:
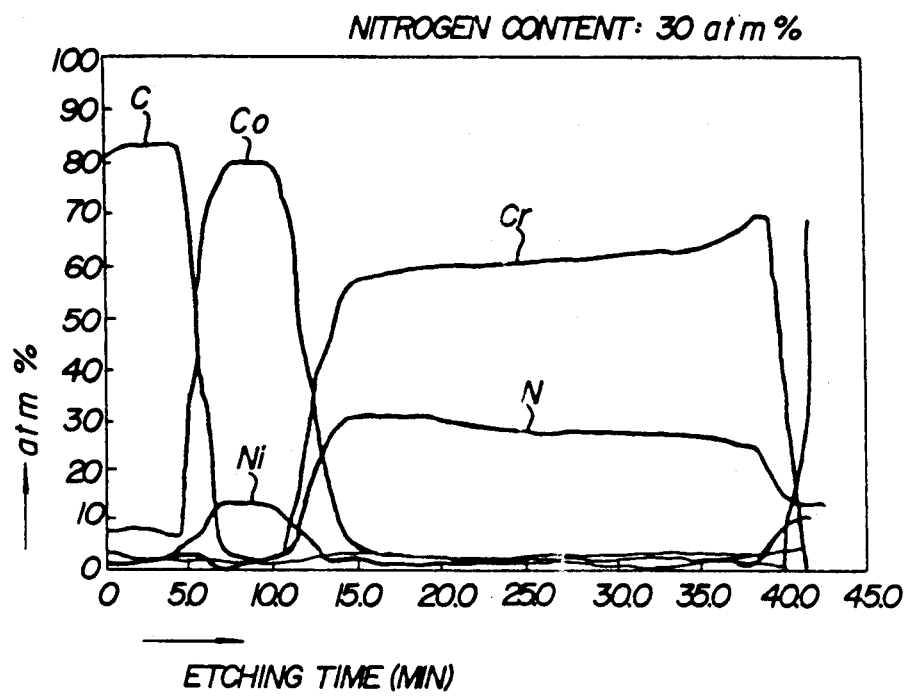
Figure 8:
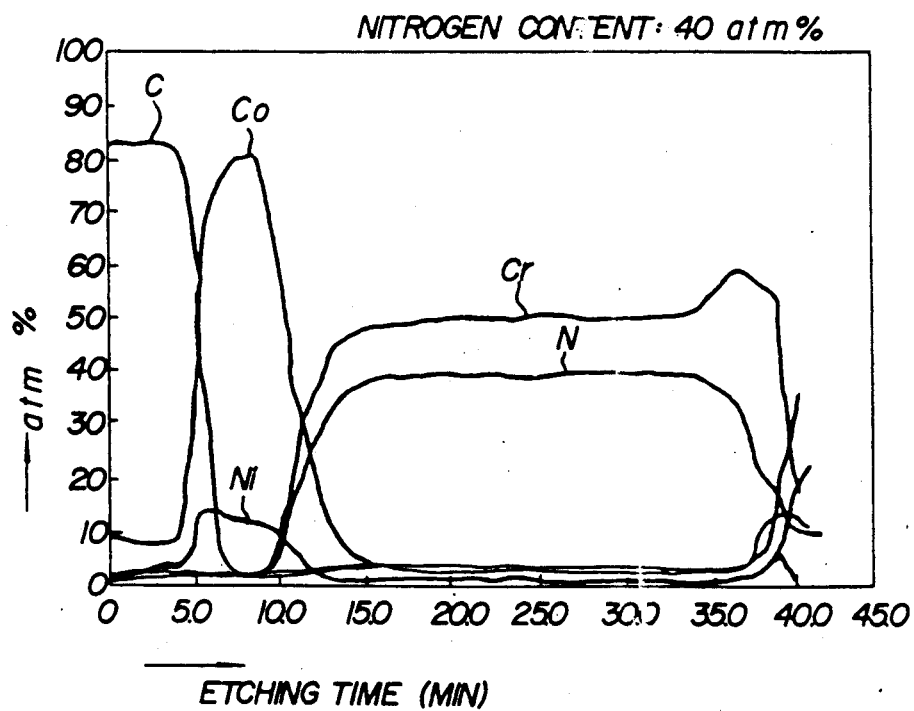

FIG. 5 shows the values for the test disk, wherein no nitrogen gas is introduced during the sputtering process of the Cr base layer. On the other hand, FIGS. 6, 7, and 8 show representative values for test disks, wherein nitrogen atoms are introduced in the Cr base layer during the Cr sputtering process to 10, 30, and 40 atom % nitrogen content, respectively. The 10, 30, and 40 atom % nitrogen content in the Cr base layer was obtained using a mixed gas of argon and nitrogen having a ratio of (99.5:0.5), (95:5), and (90:10), respectively.

Comparing the Co and Cr curves with each other in FIGS. 5 through 8, the Co and Cr curves of FIG. 6, which contain 10 atom % nitrogen in the base layer, show the smallest slope among the four figures. Next follows those of FIG. 7, which is for 30 atom % nitrogen content. Though the difference in slope is not so distinct, the very small change in the Co and Cr contents in the interface zone has an effect on the reduction of the noise level, together with the effect of grain size previously explained.

A logical analysis of the noise reduction obtained by changing the grain size or by the change in laminar composition taken separately, or the combination of both analyses does not completely explain the amount of noise reduction observed. Sometimes, aggregation of small crystal grains of magnetic material displays an almost monocrystal-like behavior magnetically forming a magnetic domain, which emphasizes the noise level. When 10 atom % nitrogen is present in the Cr base layer, as in FIG. 6, the Cr atoms, deeply diffused into the magnetic film of the Co-Ni, play an important role in preventing the growth of crystal aggregation in the magnetic film. On the other hand, when the nitrogen content is increased to about or above 30 atom %, the grain size of the Cr crystal becomes much larger than that when the nitrogen content is 10 atom %, reducing the output level and resulting in lowering a S/N level.

Taking all of the factors explained above into consideration, the magnetic recording medium of the present invention has a structure, comprising a Cr base layer containing a noise-reducing amount of nitrogen, preferably 1 atom % or higher and more preferably from 5 to 15 atom %, and a magnetic film of a Co alloy such as Co-Ni and Co-Ni-Cr, has remarkable utility in reducing the noise level and in obtaining a high S/N ratio.

The method of fabricating the magnetic recording medium, such as shown in FIG. 2, is now explained in more detail. A non-magnetic substrate 11 having a circular disk shape is fixed on a holder in a vacuum chamber of a sputtering apparatus facing the Cr target electrode. As the material of the substrate, an aluminum alloy having an alumite or nickel plated surface, or hard glass, is used. The chamber of the apparatus is exhausted to a vacuum of about $5 \times 10^{-7}$ Torr. A vacuum higher than $1 \times 10^{-6}$ Torr is preferred to prevent gas atoms impurities from being included in the sputtered layer being formed.

Figure 9:
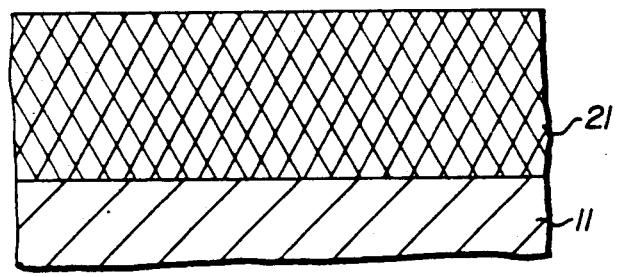

Then, a mixed gas of argon and nitrogen is introduced, and its flow rate is maintained at $30 \times 10^{-3}$ Torr in the chamber and the mixing ratio of argon and nitrogen is kept at 99.5:0.5. High frequency power of 1 KW is supplied to the Cr target electrode, Cr metal is sputtered on the substrate, and nitrogen atoms are incorporated into the Cr metal layer. The growth rate under these conditions is approximately 900 Å/min, and the base layer 21 is deposited up to a thickness of 3000 Å. Thus, the Cr base layer 21 containing 10 atom % of nitrogen is formed on substrate 11. The mixing ratio of nitrogen gas in a range of 0.5 to 1.0% is preferred for obtaining a nitrogen content of around 10 atom % in the Cr base layer. A cross section thereof is illustrated in FIG. 9.

Figure 10:
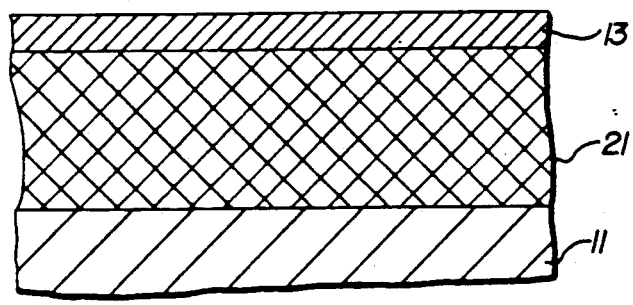

The location of the substrate is moved to another position facing the Co alloy target, in this case a Co-Ni alloy target, in the chamber, and the flow of the mixed gas is stopped. The degree of vacuum is again increased up to $5 \times 10^{-7}$ Torr. Thereafter, pure argon gas is introduced at a pressure of $30 \times 10^{-3}$ Torr into the chamber. In a similar way as for sputtering Cr onto the base layer 21, Co-Ni alloy is sputtered onto the substrate at a growth rate of 900 Å/min. As shown in FIG. 10, the magnetic film 13 of Co-Ni alloy with a thickness of 500 Å is thus formed on base layer 21.

According to the present invention, the vacuum should not be broken after the formation of base layer 21, and switchover steps to the subsequent Co-Ni sputtering process are conducted under vacuum. The switchover steps including moving the substrate, exhausting the mixed gas, and introducing a pure argon gas at the specified pressure are performed within five minutes, preferably less than three minutes, and a vacuum during switchover steps higher than $1 \times 10^{-6}$ Torr is preferred in order to avoid contamination by impurities present in the gas and to avoid deterioration in coercivity Hc of the finished recording medium.

Finally, the protecting and lubricating cover layer 14 is deposited on the magnetic film 13 by sputtering. Carbon, silicon oxide or zirconium dioxide is used as the target material for cover layer. The same sputtering apparatus can be used for this purpose, moving the substrate to another location facing the target. Depending on the situation, the process of forming cover layer 14 may be performed in another sputtering apparatus, taking out the substrate from the chamber previously used. By depositing the cover layer at a thickness of 300 Å, the magnetic recording medium of the present invention, shown in FIG. 2, is completed.

The magnetic recording medium of the invention comprising a Cr base layer containing up to 25 atom % of nitrogen shows a marked improvement in medium noise level and S/N ratio. With a nitrogen content of 5 to 15 atom %, an S/N ratio higher than 42 dB can be obtained. With a nitrogen content of about 10 atom %, the medium noise level is reduced by half and the S/N ratio is improved by 6 to 9 dB compared to those of the prior art where nitrogen is not incorporated into the Cr base layer. The magnetic recording medium of the present invention, comprising a Cr base layer containing nitrogen atoms, has the further advantage of increasing the hardness of the base layer, which contributes to increasing its durability.

This invention may be practiced or embodied in still other ways without departing from the spirit or essential characteristics thereof. For instance, while in the preferred embodiments a hard disk substrate is used, the invention may be embodied for a flexible disk or a magnetic tape using magnetic film of a Co alloy such as Co-Ni or Co-Ni-Cr. Additionally, the method of forming the Cr base layer containing nitrogen atoms and the magnetic film thereon exemplified can be replaced by other deposition methods. The preferred embodiments described herein are therefore illustrative and not restrictive, and the scope of the invention is indicated by the appended claims, rather than by the foregoing description, and all changes which come within the meaning and range of equivalency of the claims are therefore, to be embraced therein.

What is claimed is:

1. A magnetic recording medium comprising a non-magnetic substrate, a Cr base layer formed on said substrate, and a magnetic film of a Co alloy formed on said base layer, said Cr base layer having a continuous surface and containing a noise-reducing amount, comprising at least 1 atom %, of nitrogen atoms substantially uniformly distributed therein.

2. A magnetic recording medium according to claim 1, wherein said Co alloy is one of alloy selected from a group of Co-Ni, Co-Ni-Cr, Co-Ni-Mo, Co-Ni-Pt, and Co-Ni-W alloy.

3. A magnetic recording medium according to claim 1, wherein said Cr base layer contains up to 25 atom % of nitrogen.

4. A magnetic recording medium according to claim 1, wherein said Cr base layer contains 5 atom % to 15 atom % of nitrogen.

5. A magnetic recording medium according to claim 1, wherein said magnetic recording medium further comprises a cover layer formed on said magnetic film.

6. A magnetic recording medium according to claim 1, wherein said base layer and said magnetic film are formed by a sputtering process.

7. A magnetic recording medium according to claim 6, wherein said base layer and said magnetic film are formed under a continuous vacuum condition without exposing said substrate surface to the ambient atmosphere.

8. A magnetic recording medium according to claim 6, wherein said sputtering process of Cr base layer is performed using a mixed gas of argon and nitrogen, the mixing ratio of nitrogen being up to about 5%.

9. A magnetic recording medium according to claim 8, wherein said mixing ratio of nitrogen is in a range from 0.5% to 1.0%.

10. A magnetic recording medium as claimed in claim 3 wherein the grain size of said chromium base layer is smaller than it would have been had there been no nitrogen atom addition thereto.

11. A magnetic recording medium as claimed in claim 1 wherein said nitrogen is introduced into said chromium layer during a sputtering process by which said chromium layer is deposited.

12. A magnetic recording medium as claimed in claim 1 wherein said magnetic film is responsible for such noise as said medium generates, said base layer does not generate substantially any noise, and said nitrogen in said base layer reduces the noise generated from said magnetic layer.

13. A method of manufacturing a magnetic recording medium, comprising a non-magnetic substrate, a nitrogen containing Cr base layer substantially continuously covering said substrate, and a magnetic film of Co alloy formed on said base layer, said method comprising sequential steps of:

(a) forming said substantially continuous base layer, comprising chromium and nitrogen, by sputtering a Cr target on said substrate in a vacuum chamber containing a mixed gas of argon and nitrogen therein at a reduced pressure, the mixing ratio of nitrogen gas being up to about 5%, wherein introducing at least 1 atom % of nitrogen into said base layer, (b) removing said mixed gas and evacuating the vacuum chamber, and (c) forming said magnetic film by sputtering a Co alloy target above said substrate in an argon gas atmosphere at a reduced pressure.

14. A method of manufacturing a magnetic recording medium according to claim 13 wherein said step (b) is performed with a time less than five minutes.

15. A method of manufacturing a magnetic recording medium according to claim 13, wherein said method further comprises step (d) of evacuating the vacuum chamber before starting said step (a).

16. A method of manufacturing a magnetic recording medium according to claim 15, wherein vacuum degree in steps (d) and (b) is higher than $1 \times 10^{-6}$ Torr.

17. A method of manufacturing a magnetic recording medium according to claim 11, wherein said mixing ratio in step (a) is in a range from 0.5% to 1.0%.

* * * * *